United States Patent [19]

King et al.

[11] Patent Number: 4,999,533
[45] Date of Patent: Mar. 12, 1991

[54] DYNAMOELECTRIC MACHINE

[75] Inventors: James L. King; Robert E. Lykes, both of Troy, Ohio

[73] Assignee: A. O. Smith Corporation, Milwaukee, Wis.

[21] Appl. No.: 412,855

[22] Filed: Sep. 7, 1989

[51] Int. Cl.⁵ ............................................. H02K 15/14
[52] U.S. Cl. ........................................ 310/90; 310/42; 310/86; 310/89
[58] Field of Search .................. 310/42, 85, 86, 89, 310/90, 192, 211, 212, 216, 217, 264, 269; 29/596, 598

[56] References Cited

U.S. PATENT DOCUMENTS

| | | | |
|---|---|---|---|
| 3,694,906 | 10/1972 | Rank et al. | 29/598 |
| 3,955,112 | 5/1976 | Sell | 310/86 |
| 4,244,099 | 1/1981 | Haydon | 29/596 |
| 4,404,483 | 9/1983 | Lebkuchner | 310/42 |
| 4,510,679 | 8/1985 | Aleem et al. | 29/598 |
| 4,598,218 | 7/1986 | Aleem et al. | 310/42 |

Primary Examiner—Steven L. Stephan
Assistant Examiner—Judson H. Jones
Attorney, Agent, or Firm—Andrus, Sceales, Starke & Sawall

[57] ABSTRACT

A motor includes an enclosed rotor unit closely fitted and secured to a stator core unit and having extended integrated bearing units therein for rotatably supporting of the rotor unit and forming a self-contained frameless motor. The motor unit is rotatably mounted in an outer thin wall tube. The ends of the tube member are closed by bearing members having appropriate annular rotary bearings secured therein with the rotor shaft journaled in the bearings to define a frameless motor. The thin metal is formed of non-magnetic metal and has an outside diameter slightly greater than the inside diameter of the stator core. The tube is press fitted into the stator bore and forms the sole support for the metal tube. The tube is longer than the stator and rotor cores with the bearing end plate secured within each end of the metal tubes. In assembly, the rotor unit with the end bearing plates coupled to the rotor shaft can be preassembled and assembled into the metal tube and press fitted as a unit into the stator core. Alternately, the assembly can be press fitted in place with securement of the end plates and rotor unit with the tube before or after the press fitting.

23 Claims, 3 Drawing Sheets

U.S. Patent    Mar. 12, 1991    Sheet 2 of 3    4,999,533
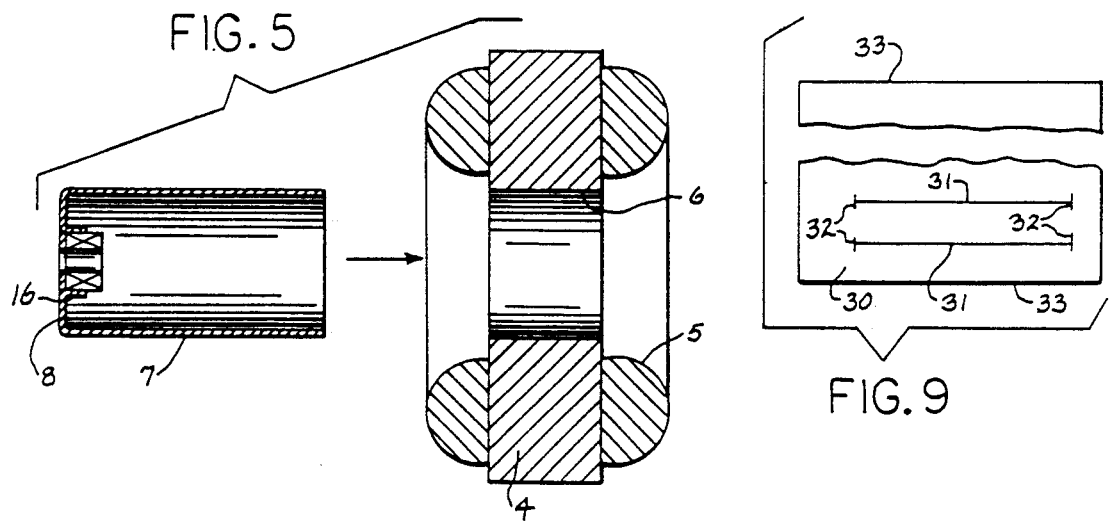
FIG. 5
FIG. 9
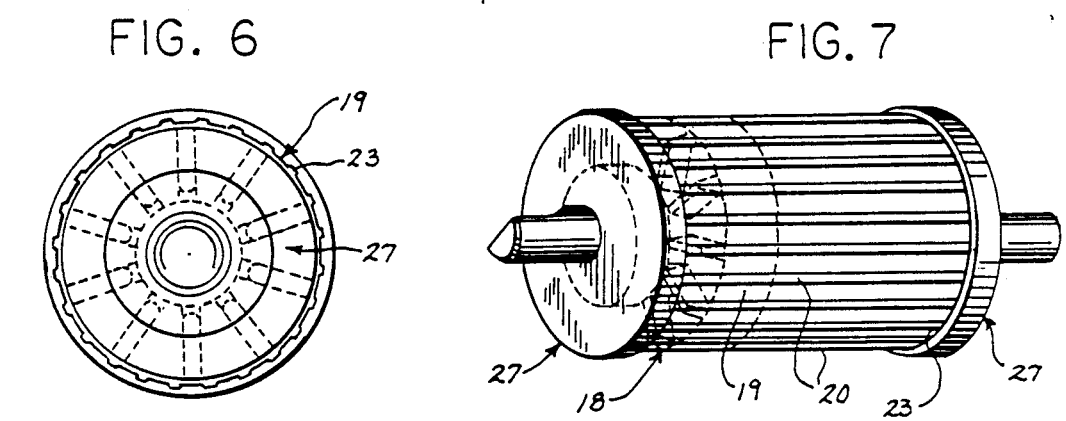
FIG. 6
FIG. 7
FIG. 8

DYNAMOELECTRIC MACHINE

BACKGROUND OF THE PRESENT INVENTION

This invention relates to a dynamoelectric machine and particularly to an electric motor adapted to be mounted within a separate enclosure.

In various electrical applications, a rotary dynamoelectric machine, such as a rotary motor, is used as a drive mechanism. In certain applications, a motor is mounted within a separate housing such as a fan housing with the motor shaft coupled to drive a fan blade. The motor includes an outer annular stator unit of any known or suitable construction. A rotor unit is rotatably mounted within the stator. A standard conventional motor will include an annular stator core of the stator unit fixedly mounted in any suitable manner within a heavy outer tubular motor frame. The frame projects axially from the ends of the stator core beyond the ends of the stator winding. The ends of the frame are machined and corresponding machined end plates are interconnected to the ends of the motor frame as by through bolts or other securement devices. Rotor bearings are secured one each within each of the end plates in appropriate alignment. The rotor shaft is journaled in the bearings with the rotor core aligned with the stator core. The machined frame ends and end plates accurately locate the bearings to support the rotor core and the stator core with air gap therebetween to permit free rotation of the rotor core. In rotating electric motor, the air gap between the rotor core and the stator core must be maintained within specified clearance limits. In many applications, efficient motor design requires minimizing of the air gap between the stator and the rotor. Strong magnetic forces are created between the cores of the stator unit and the rotor unit and a substantial frame is necessary to hold and maintain the necessary air gap between the rotor core and stator core. In addition, radial side loads may be applied to the shaft by the driven load creating even larger forces on the rotor support structure. The magnetic forces plus the radial side load forces can result in bearing radial loads of several hundred pounds. This requires rigid bearing supports, and a corresponding supporting frame, to firmly support the rotor within the stator without danger of the rotor bridging the air gap and damaging the members.

In many applications, the motor frame is not necessary because the motor is housed within a separate housing. The standard motor with the motor frame can be used. In those applications however, a frameless motor can be used wherein the stator unit can be mounted directly to the frame or a mounting base of the driven element. The rotor unit is then appropriately supported by appropriate bearing structures interconnected to each other and/or to the driven element support structure.

Although frameless motors have been suggested in the prior art, relatively complex and costly bearing support structures for the rotor and the supporting bearing assembly is provided. Further, each application generally requires a custom bearing support structure.

The prior art patents thus disclose various motor structures including separate stator units and enclosed rotor units. For example, U.S. Pat. No. 4,244,099 which issued Jan. 13, 1981 discloses an electric motor adapted to be mounted as a part of a gear train housing. The motor consists of an outer annular stator unit within an outer main frame and a separate enclosed rotor unit which extends through the stator and extends therefrom for mounting of the rotor with a press fit within an opening in the gear frame. The rotor is supported by the opening in the base wall of the housing while the stator unit is supported and located within an enlarged recess in the housing. U.S. Pat. Nos. 4,598,218 and 4,510,679 disclose similar high speed rotors where the rotor core and winding is protected by an encircling protective shell which closely fits and is secured about the core. Special shaft units project outwardly from the opposite ends of the core for mounting in separate bearing assemblies mounted in separate supports of the outer enclosure structure.

There is a need for a relatively simple but reliable and effective frameless motor construction having an integrated support for the rotor which will establish and maintain the designed running air gap over the useful life of the dynamoelectric machine.

SUMMARY OF THE PRESENT INVENTION

The present invention is related to a frameless motor having an enclosed rotor unit closely fitted and secured to a stator core unit and having extended integrated bearing units therein for rotatably supporting of the rotor unit. Generally, in accordance with the invention, the rotor unit is mounted within an outer tubular enclosure, which includes a relatively thin wall tubular member encircling the rotor core and projecting axially from the opposite end of the core. The ends of the tubular member are closed by bearing walls having appropriate annular rotary bearings secured therein. The rotor shaft is journaled in the bearings to define a frameless motor. More particularly in a preferred construction, a relatively thin metal tube is formed of a non-magnetic metal such as stainless steel and has an outside diameter slightly in excess or greater than the inside diameter of the stator core. The tube is press fitted into the stator core with an interference or press fit which preferably forms the sole support for the metal tube. The length of the tube is substantially greater than the axial length of the stator core and the axially length of the rotor. A similar metal end plate is secured within each end of the metal tube with rotary bearings secured to the center of each end plate. The end plates are fixedly secured to the metal tube in any suitable manner including a press fit.

In assembly, the rotor unit with the end bearing plates coupled to the rotor shaft can be preassembled and then assembled into the metal tube. The end plates are secured to the opposite ends of the metal tube. The rotor assembly is then press fitted into the core of a prewound stator unit to create a complete and frameless motor which is subsequently assembled to any suitable support or housing. The assembly can also be made by press fitting of the tube within the stator core, securing an end plate to one end of the tube, assemblying the rotor unit into the tube and the one plate, and finally securing the second plate to the tube and the rotor shaft.

The motor of this invention overcomes many of the disadvantages and objections presently associated with the specifications requiring frameless electric motors or other dyamoelectric motors. Although shown and uniquely adapted to electric motors, it is obviously equally applicable to any other dyamoelectric machine having similar requirements and applications.

The present invention provides a low cost, effective self-contained frameless motor which can be readily produced in various sizes and with various bearing specifications. The motor requires only standard well known technology and materials and is thus particularly adapted to commercial implementation.

BRIEF DESCRIPTION OF DRAWINGS

The drawings furnished herewith illustrate a preferred construction of the present invention in which the above advantages and features are fully explained hereinafter.

In the drawings:

FIG. 5 is a view similar to FIG. 4 illustrating an alternative assemblying procedure;

FIG. 6 is an end view of an alternate embodiment of a rotor unit;

FIG. 7 is a pictorial view of a rotor unit shown in FIG. 6;

FIG. 8 is an enlarged fragmentary vertical section illustrating detail of the alternate embodiment;

FIG. 9 is a plan view of a plate for forming a component shown in FIGS. 6-8;

DESCRIPTION OF THE ILLUSTRATED EMBODIMENT

Figure 1:
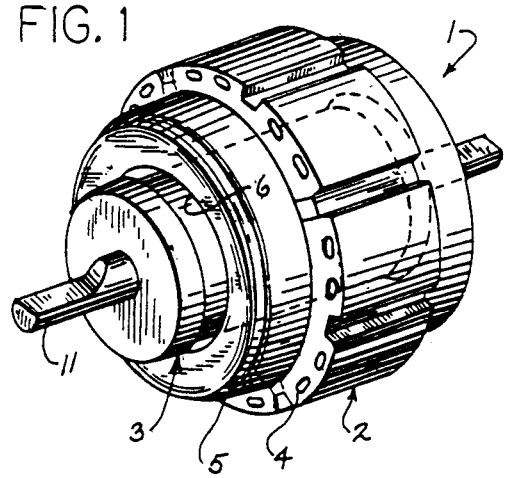
FIG. 1 is a pictorial view of a frameless electric motor.
Figure 2:
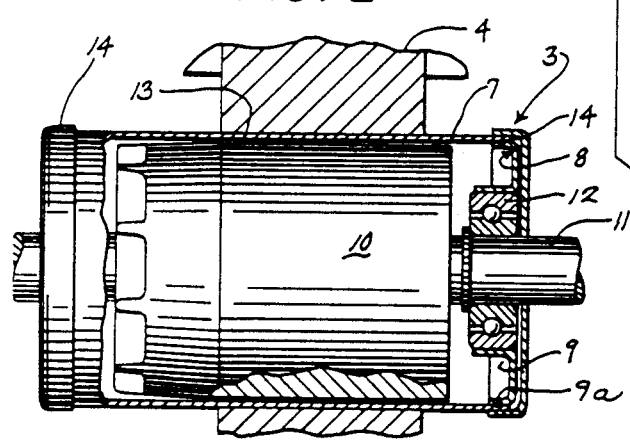
FIG. 2 is a side elevational view of the frameless electric motor shown in in FIG. 1 with parts broken away and sectioned.

Referring to the drawings and particularly to FIG. 1, a frameless electric motor 1 is illustrated including an outer annular stator unit 2 within which a self-contained rotor unit 3 is mounted. The stator unit 2 includes an annular core 4 with a winding 5 wound on the inner peripheral face thereof in accordance with conventional practice and defining a clear axial opening or bore 6 through the stator core 4. The rotor unit 3 is a self-contained assembly, which in accordance with the teaching of the present invention, is secured within and to the stator bore 6 of core 4. Generally, the rotor unit 3 includes an outer tubular member 7 which is fixedly secured, preferably by a press fit, within the stator bore 6. The tubular member 7 projects from the opposite ends of the core 4. Rotor end plates 8 are secured, one each, within the opposite ends of the tubular member 7. The end plates 8 are shown as generally cup-shaped member having an outer flange telescoped into the end of the tubular member. The end plates 8 are secured in place, as by a spot weld 9a, a press fit or other suitable construction. A rotor, including a rotor core 10 and a suitable internal winding is mounted on a shaft 11. The shaft 11 extends from the opposite ends of core 10 through the end plates 8 and 9, with at least one end projecting from the tubular member and end plates. Each of the end plates 8 includes a similar rotary bearing unit 12 secured to the end plates, with the corresponding end of the shaft 11 journalled therein. The diameter of the rotor core 10 is slightly less than the internal diameter of the tubular member 7 and defines a constant air gap 13. The length of the air gap 13 and the thickness of member 7 is selected to define the specified air gap required for proper operation of motor 1. The rotor unit 3 is appropriately balanced for rotation within the enclosure member 7. End seal caps 14 are shown secured over the opposite ends of the tubular member 7 to seal the bearing and rotor.

The rotor unit 3 is totally enclosed within its own supportive enclosure or housing defined by the tubular member, the end plates 8 and 9 and end caps 13 to form a separate self-contained and effectively sealed module. The self-contained module is secured and supported within the stator unit by an appropriate interengagement between the external surface of the member 7 and the internal surface of the stator bore 6. In a preferred construction, the tubular member 7 is secured by an interference fit between the member 7 and stator core 2, as by a press fit. The tubular member 7 is formed of an appropriate relatively thin non-magnetic material such as stainless steel or other non-magnetic material at least in the air gap 13 between the rotor core 10 and the stator core 4. The tubular member 7 and the end plates 8 and 9 can be readily constructed of a sufficiently self-supporting metal or other material to rotatably support the rotor 10 in the final assembly. In the design of the unit, consideration must of course be given to thé side loads created by the interacting magnetic forces and the like as well as the mechanical loads placed on the bearing supports by the driven load device, not shown. The tubular member 7 is formed of a minimum necessary thickness to insure the desired mechanical support and therefore minimizes the air gap 13 between the stator and rotor cores. The minimum air gap is of course significant to maximize the magnetic efficiency of the motor.

The frameless motor can then be utilized in any desired manner such as that conventionally used to date. For example, conventional cushioned end rings, flexible isolation arms, mounting studs or the like can be used with the illustrated motor. The open construction of the stator of course will normally require mounting of the motor in an enclosure to isolate the stator windings from the environment.

Figure 4:
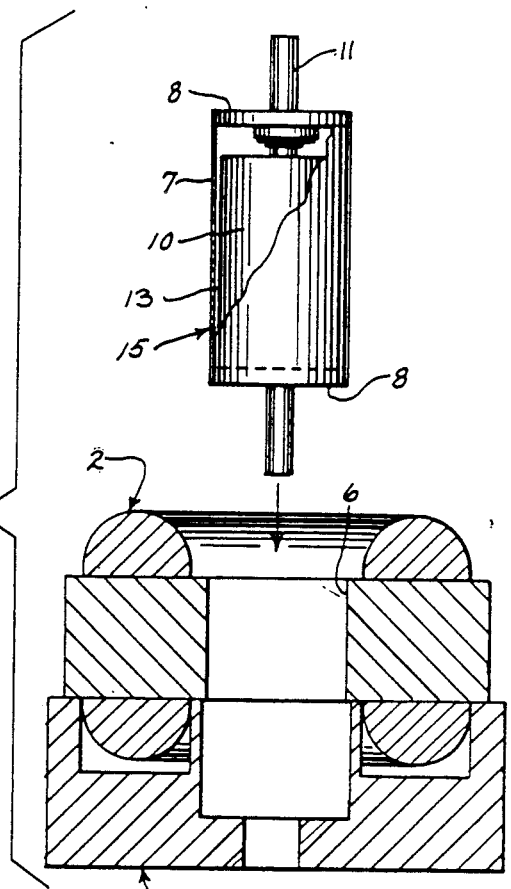
FIG. 4 is a diagrammatic view illustrating a method of assemblying the motor of FIGS. 1-3.
Figure 3:
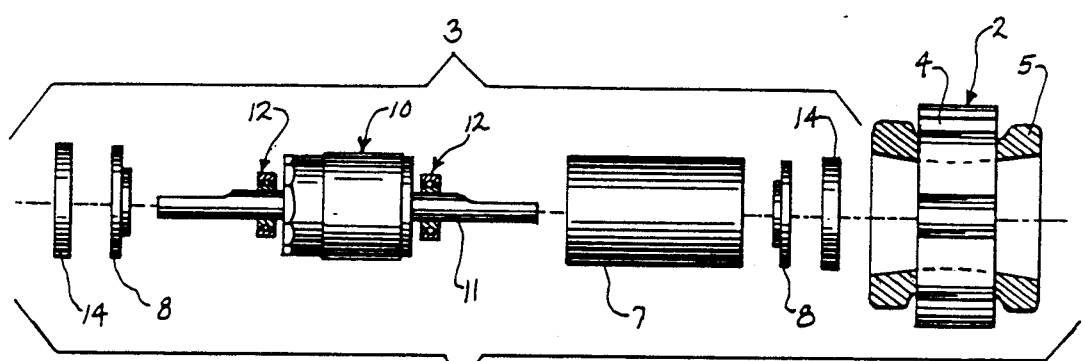
FIG. 3 is an exploded view of the assembly shown in FIGS. 1-3.

The two-piece motor 1 can be assembled and formed in any desired sequence of assembly in which the tubular member 7 is secured within the bore 6 of stator core 4, and preferably by an interference or press fit between of the tubular member 7 and the stator core 4. For example, the rotor unit can be formed as a complete enclosed sub-assembly separate from the stator unit 2, as shown at 15 in FIG. 4. After such assembly, the stator unit 2 is mounted in a suitable fixture 16 and the rotor module 15 is aligned with stator bore 6 in a wound stator core 4, as shown in FIG. 5, and press fitted into the bore 6. The cores 4 and 10 are precisely aligned with the air gap 13 between the two cores. The end caps 14 are then secured to the rotor module 15.

An alternative method of assembly is shown in FIG. 6 in which the tubular member 7 is press fitted directly into the bore 6 of the wound stator core 4 prior to assembly of the rotor and shaft 11. One end plate 8 is pre-assembled with the member 7, or assembled therewith immediately after press fitting. In a preferred construction, as shown in FIG. 5, the tubular member 7 and the end plate 8 are formed as a single drawn element similar to a drawn cup-shaped member such as widely formed for beverage cans and the like. The bearing support flange 16 is integrally formed with the end plate 8 and the bearing 12 assembled with the end plate. The tubular member 7 is press fitted to the bore 6 and the rotor core 10 and then assembled through the open end of the member 7, with the shaft 7 journaled in the integral end plate 8. The second end bearing plate 8 is placed over the shaft and secured into the open end of the tubular member 7.

Where a separate end plate 8 is provided, a press fit provides a simple, reliable and cost effective construction.

One practical construction of the present invention includes a thin stainless metal tube having a thickness of approximately 0.007 inches. Pressed metal end plates and standard bearings secured in opposite ends of the thin metal tube. The metal tube has an exterior diameter of 2.500 inches which was press fitted within a stator core bore. The stator bore 6 had a diameter of 2.509 inches to establish a firm interengagement and interference fit. The rotor module is of course necessarily constructed with sufficient rigidity to resist the magnetic and applied side loads appearing on the rotor and rotor shafts. Further, the metal tube has sufficient stability to maintain clearance between the outside diameter of the rotor core and the inside diameter of the metal tube, within the specified normal minimum air gap 13 between the stator and rotor cores for the motor. The thin metal tube provides a significant structural support more than adequate to support the bearing structures.

A further embodiment is shown in FIGS. 6 through 8, in which a rotor housing 18 includes a plurality of axially extended slots 19 and wedge ribs 20 to the opposite edges of the slots. The slots 19 are circumferentially spaced in accordance with the spacing of the winding slots 21 of a stator core 22. The ribs 20 are integrally secured to cylindrical end extension portions or members 23 to form the tubular housing 18. The diameter of the housing 18 between the ribs 20 is selected to establish an interference fit between the bore 24 of the stator core 25 and the outer diameter of the housing as at 26. The ribs 20 project into the stator slots 21. The ends of the tubular rotor housing 18 are closed by end bearing plates 27 such as in the prior embodiment to support a rotor core 28 with a minimum air gap 29 between the housing 18 and the rotor core. More particularly, the ribs extend radially from the housing 18 and are circumferentially spaced in accordance with the stator slots 21. The ribs project through the stator slots into abutting engagement with the winding units embedded within the slot and firmly support the winding in place. The inner location of the rib places the cylindrical plane of the housing in the plane of the stator bore. The rotor core is now spaced from the stator core by no more than the specific air gap between the stator core and the rotor core.

The housing is formed of a non-magnetic material such as metal, molded plastic, molded aluminum or the like.

If formed of metal, a thin metal plate 30, as shown in FIG. 9, may be formed and wound to form the housing. The ribs are formed by cutting the plate on a center line 31 at least for the length of the stator slots, and at the ends of the center cut for the width of the housing slots as at 32. The lips are bent outwardly to form the elongated housing slot 19 and the outwardly extended ribs 20. The slotted and ribbed plate 30 is rolled on the smooth face opposite the ribs and the abutting end edges 33 of the plate are welded or otherwise secured to form a constant internal diameter slightly greater than that of the rotor core 28.

Figure 10:
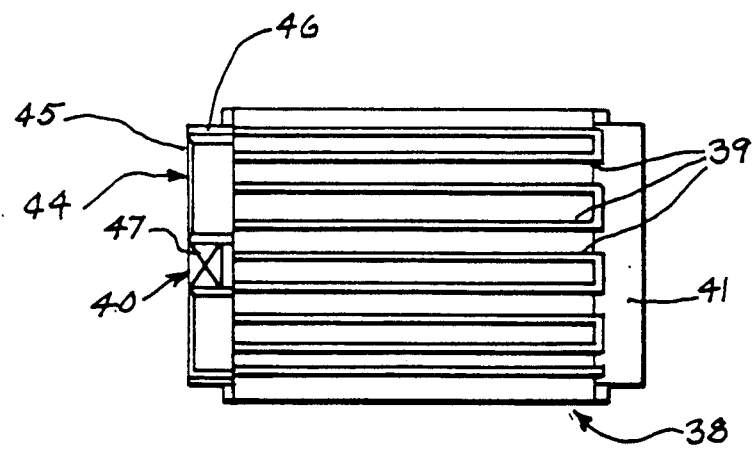
FIG. 10 is a side view of an alternate embodiment of the invention.
Figure 11:
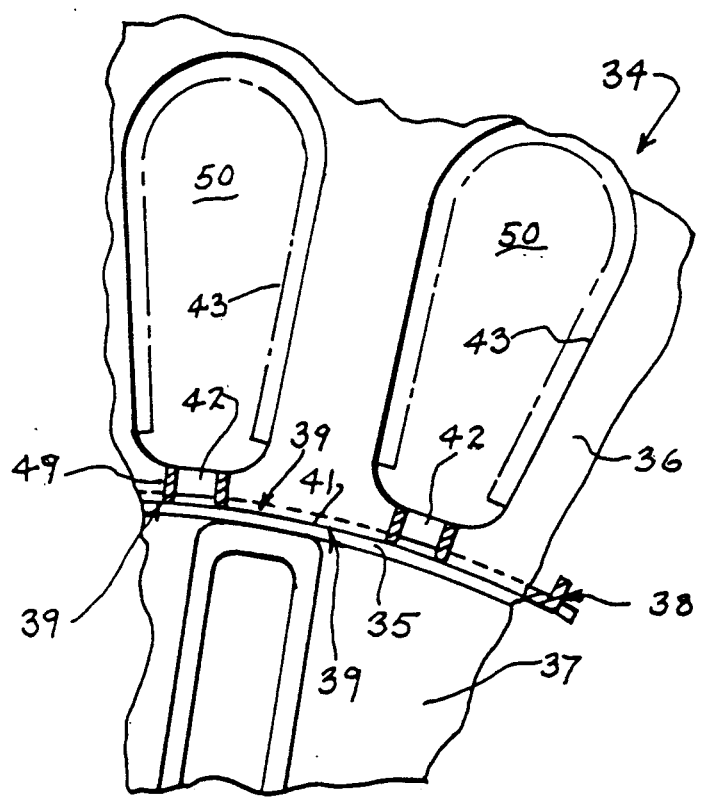
FIG. 11 is an enlarged fragmentary end view similar to FIG. 8 for the rotor mount of FIG. 10 with parts broken away and sectioned to show internal detail of the rotor unit and stator unit.

A further embodiment of the invention is shown in FIGS. 10 and 11 wherein a self-contained motor 34 is constructed without a member within the air gap 35 between the stator core 36 and the rotor core 37.

As shown in FIG. 10, a rotor housing 38 is a ribbed cage unit including a plurality of equicircumferentially spaced ribs 39 connected to end bearing rings 40 and 41. Each rib 39 is correspondingly formed to fit within a slot opening 42 of the winding slots 43 and to project from the opposite ends of the stator core 36. Bearing plates 44 are suitably secured within the end rings 40 and 41 and are shown as cup-shaped members having a flange 45 fitted within the end ring and spot welded to the end ring as at 46. Bearings 47 are secured within the bearing plates 44 and rotatably support the rotor shaft, not shown, and thereby rotor core 37 in alignment with the stator core 36.

As most clearly shown in FIG. 11, each rib 39 is generally U-shaped with sidewalls 49 which abut the sidewalls of the slot and the winding 50 within the slot 43. The windings 50 are located within the slots 43 with each winding located on essentially the same radius with respect to the axis of rotation. The ribs 39 are located with the inside diameter of each rib referenced to the top of each slot opening 42. The ribs 39 are thus precisely located with respect to the axis of rotation and correspondingly support the bearings of the rotor unit.

The embodiment of FIGS. 10 and 11 does not introduce any member within the air gap 35 and thereby allows creating of a minimal length air gap. The ribs being secured within the slots in engagement with the winding also act as a mechanical wedge supporting the winding 50 and thereby prevents loosening of the winding and possible movement into the stator bore and destructive engagement with the rotor core 37.

The self-contained rotor unit with the housing having a nominal diameter greater than the stator bore and having the projecting rotor support provides a highly efficient ventilation and cooling of the motor when mounted in an appropriate environment. The improved cooling reduces the required magnetic material and conductive material for any given specification and thereby permits reduction in the size and cost of the core, and in the size and cost of the winding conductors. As the outer main frame normally assembled with the stator unit is eliminated, the size of the motor is somewhat smaller than other conventional motors. The elimination of the main frame and use of relative small bearing end members also reduces the material cost. The two piece construction of the stator and rotor modules with the interference or press fit to form a complete motor provides a readily fabricated and assembled motor. Structurally, the system is strong and is commercially acceptable for many applications. The separate rotor module with the interference fit also accurately locates the rotor with respect to the stator to establish an improved air gap setting. The use of the rotor end plates secured within the rotor also allows factory setting of rotor end play during assembly. Further, the end-play is controlled in the assembly process rather than in eleborate part designs as in a more conventional motor assembly.

The assembly is particularly adapted to formation of motors of different axial length. Thus, the tubular member can be formed to the length corresponding to the shaft requirements and the interrelationship between the stator and rotor. The end plates or other closure members are then appropriately secured to the ends of the proper length tube to form the total enclosure.

The present invention thus provides a simple, reliable and inexpensive motor construction particularly adapted to a frameless motor.

Various modes of carrying out the invention are contemplated as being within the scope of the following claims and particularly pointing out and distinctly claiming the subject matter which is regarded as the invention.

We claim:

1. A dynamoelectric machine, comprising an annular stator having a cylindrical central bore of a constant diameter, a self-contained and enclosed rotor unit including a magnetic rotor core mounted on an intermediate portion of a supporting shaft, said rotor unit including an outer enclosure including a non-magnetic supporting tubular housing member located within said stator bore and secured to the stator bore to form the sole support of said housing member, said enclosure including end bearing plates having a first end plate secured to a first end of said tubular member and a second end plate secured to a second end of said tubular member, said rotor supported within said housing with said opposite ends of said shaft respectively rotatably mounted in said first end plate and said second end plate, said rotor unit located within said central bore of said stator core with an interference fit between the exterior surface of said housing member and said central opening to form essentially the sole support of said rotor unit and thereby defining a self-contained operative dynamoelectric machine.

2. The machine of claim 1 wherein said housing member is a tube of a constant diameter and is secured to said stator bore by an interference fit between said tube and said bore.

3. The machine of claim 1 wherein said stator includes a plurality of radially distributed winding slots in said inner bore and a winding wound in said slots, said housing member includes a plurality of radial ribs projecting into said winding slots to secure the housing member in place.

4. The machine of claim 3 wherein said ribs engage said winding in said slots and support said windings.

5. The frameless dynamoelectric machine of claim 2 wherein said tube is formed of non-magnetic steel having a thickness of essentially 0.007 inches and a diameter about 2.509 inches greater than said stator bore.

6. The machine of claim 2 wherein said housing member is stainless steel.

7. A dynamoelectric machine, comprising an annular stator having a cylindrical central bore of a constant diameter, a self-contained and enclosed rotor unit including a magnetic rotor core mounted on an intermediate portion of a supporting shaft, said rotor unit including an outer enclosure having a non-magnetic supporting tubular housing member having an internal diameter slightly greater than the outside diameter of said rotor core and an external diameter slightly greater than stator bore, said enclosure including end bearing plates having a first end plate secured to a first end of said tubular housing member and a second end plate secured to a second end of said tubular housing member, said rotor supported within said housing member with said opposite ends of said shaft respectively rotatably mounted in said first end plate and said second end plate, said rotor unit located within said central opening of said stator core with an interference fit between the exterior surface of said housing member and said control opening to form essentially the sole support of said rotor unit and thereby defining a self-contained operative dynamoelectric machine.

8. The dynamoelectric machine of claim 7 wherein said tubular housing member is formed of a non-magnetic metal having a thickness of essentially 0.007 inches.

9. The machine of claim 8 wherein said housing member is stainless steel.

10. The dynamoelectric machine of claim 7 wherein said end plates are identical elements, each of said end plates having a flange member defining a cylindrical surface having a diameter slightly greater than the internal diameter of said tubular housing member, said end plate members being secured within the ends of said tubular housing member by an interference fit.

11. the dynamoelectric machine of claim 7 wherein said bearing supports are plate-like members having an annular flange adapted to telescope over the housing member, and including an outer sealing cap telescoped over the end of said rotor.

12. The machine of claim 7 wherein said tubular housing member is a constant diameter tube.

13. The machine of claim 12 wherein said housing member is formed of a non-magnetic metal having a thickness on the order of 0.007.

14. The machine of claim 7 wherein said tube member has an outside diameter approximately 0.0005 inches greater than the internal diameter of said stator bore.

15. The machine of claim 7 wherein said end plates are formed as generally cup-shaped members having an outer annular integral sidewall of an outer diameter slightly in excess of the internal diameter of said tubular housing member, said cup-shaped member being press fitted within said tubular housing member to firmly support said end plates to said tubular housing member.

16. The machine of claim 7 wherein said tubular housing member and said one end plate are integrally formed as a single integral member.

17. The machine of claim 16 wherein the second of said end plates is secured to said tubular housing member by an interference fit.

18. A rotor structure including a rotor core for mounting within the bore of an annular stator core having a constant diameter opening with a minimum airgap between the stator core and rotor core, said core mounted on a shaft projecting coaxially from opposite ends thereof and having an outer cylindrical surface, the improvement comprising a cylindrical tube member telescoped over the core and projecting axially therefrom having a central axis end plate members secured one each to the opposite side of said rotor core to said tube member, bearings in each of said end plates located on said axis and supporting said shaft to define a self-contained rotor unit, said tube member being spaced slightly from said rotor core and adapted to be secured within said stator core with an interference fit between the exterior surface of said tube member and the interior surface of said core at least in the common axial portion between the stator core and the rotor core, and said tube member being formed of a thin high strength material to form the sole support for said bearings and said rotor core.

19. The rotor structure of claim 18 wherein said stator core includes circumferentially distributed winding stator slots, and said cylindrical tube member includes radial ribs projecting radially outwardly, said ribs being spaced in accordance with the stator slots and having a length corresponding to the axial length of the stator slots.

20. The method of forming a dynamoelectric machine including an annular stator with a constant diameter central stator opening, and a rotor having a rotor core with a shaft projecting coaxially from opposite ends of the rotor core and with an outside diameter less than the internal diameter of said stator core to define an air gap between the stator core and the rotor core with the rotor concentrically mounted within the stator core, comprising assembling a tubular housing member with end bearing plates closing the opposite end of said housing member, said end bearing plates each including a bearing member located on a common rotary axis, assembling said rotor within said housing member with said shaft journalled in said bearing members to provide a self-contained enclosed rotor module, and assembling said housing member within said stator core opening with said rotor core aligned with said stator core and with an interference fit between the external surface of the tubular housing member and the external surface of the stator core, said interference fit constituting the sole operating support of said rotor within said stator core to permit operation defining an operative dynamoelectric machine.

21. In the method of claim 20, wherein said rotor module is formed prior to assembly with said stator core unit, and said housing member is press fitted within said stator core opening after said forming of said self-contained module.

22. In the method of claim 20, wherein said housing member is press fitted within said stator core openings prior to the assembly of said rotor within said housing member.

23. In the method of claim 20, wherein said housing member is assembled with a single end plate to form a sub-assembly, and including the step of press fitting said housing into said stator core opening as said sub-assembly, thereafter assembling said rotor within said housing member and said first end plate, and thereafter assembling said second end plate with said rotor and said open end of said tubular housing member to complete forming of said dynamoelectric machine.

* * * * *